W. H. HORNUM.

FARE-REGISTER.

No. 6,946. Reissued Feb. 22, 1876.

Attest:
Otto Stufeland
Chas. Wahlers

Inventor:
William H. Hornum
Van Sandwood & Hauff
Attys

UNITED STATES PATENT OFFICE.

WILLIAM H. HORNUM, OF NEW YORK, N. Y., ASSIGNOR OF PART INTEREST TO ARCHIBALD HANCE.

IMPROVEMENT IN FARE-REGISTERS.

Specification forming part of Letters Patent No. 165,832, dated July 20, 1875; reissue No. 6,946, dated February 22, 1876; application filed January 11, 1876.

*To all whom it may concern:*

Be it known that I, WILLIAM H. HORNUM, of the city, county, and State of New York, have invented a new and useful Improvement in Fare-Registers, which improvement is fully set forth in the following specification, reference being had to the accompanying drawing, in which—

Figure 1:
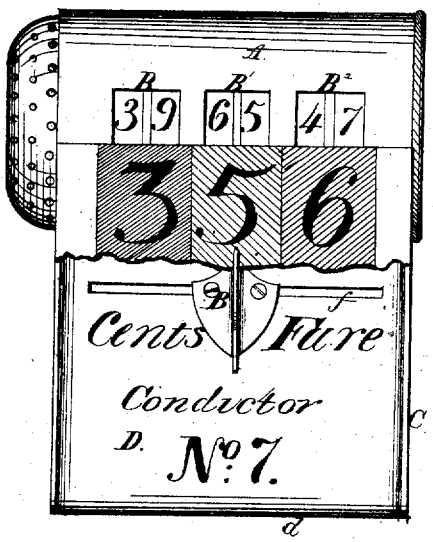
Figure 2:
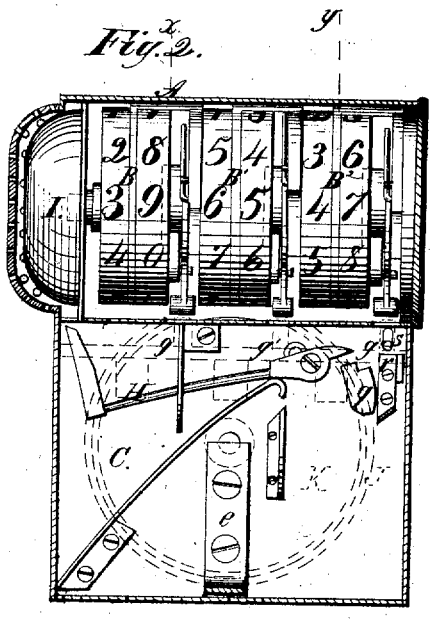
Figure 3:
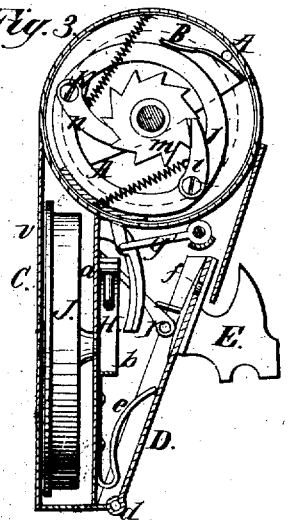
Figure 4:
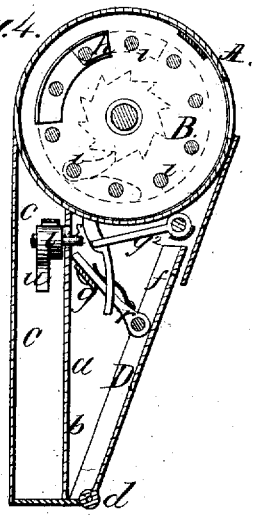
Figure 5:
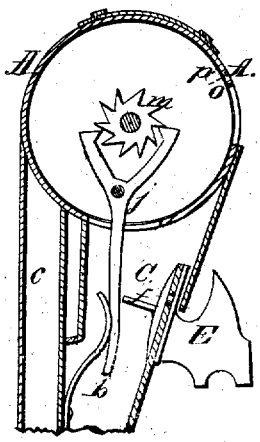

Figure 1 represents a face view, some portions being broken away to expose the working parts. Fig. 2 is a longitudinal section. Fig. 3 is a transverse section in the plane *x x*, Fig. 2. Fig. 4 is a similar section in the plane *y y*, Fig. 2. Fig. 5 is a transverse section of a modification of the same.

Similar letters indicate corresponding parts.

This invention consists in the combination of a switch with two or more register-levers, each of which acts on a distinct set of registering-wheels, and with a main lever or trigger, so that by moving the switch one and the same trigger serves to actuate different sets of registering-wheels. With the switch, the main trigger, the registering-levers, and the several sets of registering-wheels are combined a hammer and a bell, so that whenever the main trigger is actuated, and a fare is registered on either of the sets of registering-wheels, the bell is sounded.

With the switch and main trigger is combined one or more registering devices and a general registering device, the operation of which will be fully hereinafter described.

In the drawing, the letter A designates a cylindrical case, which contains two or more sets of registering-wheels, B $B^1$ $B^2$, and which is fastened to another case, C, that is divided by a partition, *a*, in two compartments, *b c*. The front plate D is connected to the body of the case by a hinge-joint, *d*, and a spring, *e*, has a tendency to force said front plate out to the position shown in Figs. 3 and 4. In this front plate is a slot, *f*, which forms the guide for a switch, E, and beneath said front plate are two or more levers, *g* $g^1$ $g^2$, each of which serves to actuate one of the sets of registering-wheels B $B^1$ $B^2$. Each set of registering-wheels consists of a unit-wheel and a ten-wheel, the unit-wheel being provided with a spring-pawl, *h*, which, whenever said unit-wheel has completed nine-tenths of a revolution, engages with one of ten pins, *i*, projecting from the side of the ten-wheel, and as the unit-wheel completes the last tenth of its revolution, the ten-wheel is moved with it.

The mechanism for propelling the registering-wheels, as shown in Fig. 3, consists of an anchor, *j*, which swings on a pivot, *k*, and carries a spring-pawl, *l*, that engages with a ratchet-wheel, *m*, secured to the unit-wheel, said ratchet-wheel being provided with ten teeth, so that each time the appropriate lever *g*, $g^1$, or $g^2$ is actuated, the corresponding unit-wheel is propelled one-tenth of a revolution. A stop-pawl, *n*, prevents said unit-wheel from moving backward.

On the face of each of the registering-wheels are marked the figures from 0 to 9, and, consequently, each set of registering-wheels is capable of registering ninety-nine fares.

In the mechanism shown in Fig. 3 the levers *g* $g^1$ $g^2$ are detached from the anchor *j l*; but, if desired, the levers *g* $g^1$ $g^2$ may be made in one piece with their anchors, as shown in Fig. 5. By this arrangement the registering-wheels are effectually prevented from being turned forward, except by the action of the appropriate lever; but each set of registering-wheels may be turned backward, until caught by a stop, *o*, secured to one of the wheels, and by a lug, *p*, fastened to the case A. In either case the person in charge of the fare-registers, or the superintendent, is enabled to place each set of registering-wheels to its starting-point.

The switch E can be moved over either of the levers *g* $g^1$ $g^2$, and if the front plate D, which forms the main trigger, is then depressed, the switch acts on the lever beneath it, and the corresponding registering mechanism B $B^1$ $B^2$ is propelled one step. One of these registering mechanisms is intended for three-cent fares, one for five-cent fares, and one for six-cent fares, and, if desired, still more registering mechanisms may be added for fares of other amounts.

On the main trigger D is secured a compound pawl, *q r*, and if said main trigger is depressed, the arm *q* of said pawl acts on the tail end of the hammer H, so as to cause the same to strike the bell I. The arm *r* of said compound pawl acts on pin, *s*, which projects from a lever, *t*, situated in the lower compartment *c* of the case C. This lever carries a spring-pawl, *u*, that engages with teeth cut in the periphery of a ring, J, that embraces a disk, K. The ring J and the disk K form the general registering mechanism. Said ring is provided on its face with figures from 1 to 100, and the disk K bears on its face one hundred radial marks and figures, beginning with 1 and running from 5 to 5, the ring being connected to the disk in such a manner that for each complete revolution of the ring the disk is caused to move one-hundredth part of a revolution, and thus by means of this general registering device ten thousand passengers can be registered. The figures and marks of the ring and disk can be seen through an aperture, *v*, in the back plate of the case C; and since this general registering device will be moved invariably one step for each depression of the main trigger D, the number indicated by it for each trip must tally with the sum of the numbers indicated by the several registering devices B $B^1$ $B^2$ for the same trip. At the end of each trip the single-fare registering devices are set to their starting points, while the general registering mechanism remains undisturbed, and continues to add up all the fares taken during a long period of time.

The conductor of a railroad car or train fastens my fare-register in a convenient position on his person, and on receiving a fare he moves the switch to the appropriate lever, and then he depresses the main trigger. This operation he can easily perform with one hand, and the number and amount of fares received can be read off at the end of each trip.

What I claim as new, and desire to secure by Letters Patent, is—

1. The combination of a switch, E, with a main trigger, D, and with two or more levers, *g* $g^1$ $g^2$, and corresponding registering devices B $B^1$ $B^2$, substantially as shown and described.

2. The combination of a switch, E, main trigger D, two or more registering devices, B $B^1$ $B^2$, and a bell and hammer or other alarm, substantially as set forth.

3. The combination, with the switch E and main trigger D, of the registering devices B $B^1$ $B^2$, (one or more,) and a general registering device, J K, substantially as and for the purpose described.

In testimony that I claim the foregoing I have hereunto set my hand and seal this 6th day of January, 1876.

WILLIAM H. HORNUM. [L. S.]

Witnesses:

W. HAUFF,

E. E. KASTENHUBER.